(12) United States Patent
Hudson et al.

(10) Patent No.: US 7,315,256 B2
(45) Date of Patent: Jan. 1, 2008

(54) MAGNETIC SIGNALLING IN PIPELINES

(75) Inventors: Steven Martin Hudson, Sturminster Newton (GB); Daniel Joinson, Carterton (GB)

(73) Assignee: Expro North Sea Limited, Berkshire (GB)

( * ) Notice: Subject to any disclaimer, the term of this patent is extended or adjusted under 35 U.S.C. 154(b) by 484 days.

(21) Appl. No.: 10/491,960

(22) PCT Filed: Oct. 11, 2002

(86) PCT No.: PCT/GB02/04623

§ 371 (c)(1), (2), (4) Date: Oct. 5, 2004

(87) PCT Pub. No.: WO03/033875

PCT Pub. Date: Apr. 24, 2003

(65) Prior Publication Data

US 2005/0030198 A1 Feb. 10, 2005

(30) Foreign Application Priority Data

Oct. 11, 2001 (GB) .................................. 0124451.6

(51) Int. Cl.
*G01V 3/00* (2006.01)

(52) U.S. Cl. .............................. 340/854.6; 340/853.1; 340/854.4; 340/870.1

(58) Field of Classification Search ............ 340/854.6, 340/854.4, 853.1, 855.1; 367/81; 73/861; 324/200, 370; 336/83, 90

See application file for complete search history.

(56) References Cited

U.S. PATENT DOCUMENTS 4,739,325 A 4/1988 Macleod et al.

(Continued)

FOREIGN PATENT DOCUMENTS

EP 0 273 379 7/1988
GB 2 341754 3/2000

OTHER PUBLICATIONS

Shen, L. C. et al., "Electromagnetic Field Due to a Magnetic Dipole in a Medium Containing Both Planar and Cylindrical Boundaries", IEEE Transactions on Geoscience and Remote Sensing, vol. GE-23, No. 6, pp. 827-833, Nov. 1985.

(Continued)

*Primary Examiner*—Jeffery Hofsass
*Assistant Examiner*—Sisay Yacob
(74) *Attorney, Agent, or Firm*—Finnegan, Henderson, Farabow, Garrett, & Dunner L.L.P.

(57) ABSTRACT

Method systems and apparatus for signalling within pipelines. The systems methods and apparatus make use of a unit locatable within a tubular piece of metallic structure for the transmission and/or reception of signals. The unit includes a magnetic material core (6) which provides a path for magnetic flux through the unit (4). A coil (81) is wound around a portion of the magnetic material core (6) to allow the detection and/or application of magnetic flux in the magnetic core (6). At each end of the core (6) there is pair of arms (63) which are arranged for location adjacent the inside surface of the tubular structure. In use magnetic signals flowing in the tubular structure pass through the core (6) and can be detected via the coil (81) in receive mode and similarly signals flowing in the coil (81) can cause magnetic flux to flow through the core (6) and into the metallic structure in transmit mode.

32 Claims, 3 Drawing Sheets

U.S. PATENT DOCUMENTS

| | | | |
|---|---|---|---|
| 4,845,494 A | | 7/1989 | Hanson et al. |
| 5,512,889 A | * | 4/1996 | Fletcher .................... 340/854.6 |
| 5,576,703 A | | 11/1996 | Macleod et al. |
| 5,945,923 A | * | 8/1999 | Soulier ..................... 340/854.6 |
| 6,188,223 B1 | * | 2/2001 | Van Steenwyk et al. .... 324/370 |
| 6,249,259 B1 | | 6/2001 | Goodman et al. |
| 6,615,848 B2 | * | 9/2003 | Coats ....................... 134/22.11 |

OTHER PUBLICATIONS

Hill, D. A., "Magnetic Dipole Excitation of a Long Conductor in a Lossy Medium", IEEE Transactions on Geoscience and Remote Sensing, vol. 26, No. 6, pp. 720-725, Nov. 1988.

Zhang, Y. et al., "The Performance Evaluation of MWD Logging Tools Using Magnetic and Electric Dipoles by Numerical Simulations", IEEE Transactions on Geoscience and Remote Sensing, vol. 34, No. 4, pp. 139-144, Jul. 1996.

Bhagwan, J. et al., "Mutal Inductance of Coils on a Cylinder of Infintie Length", IEEE Transactions on Magnetics, vol. MAG-16, No. 2, pp. 477-479, Mar. 1980.

Wait, J.R. et al., "Transient Signals form a Buried Magnetic Dipole", Journal of Applied Physics, vol. 42, No. 10, pp. 3866-3869, Sep. 1971.

* cited by examiner

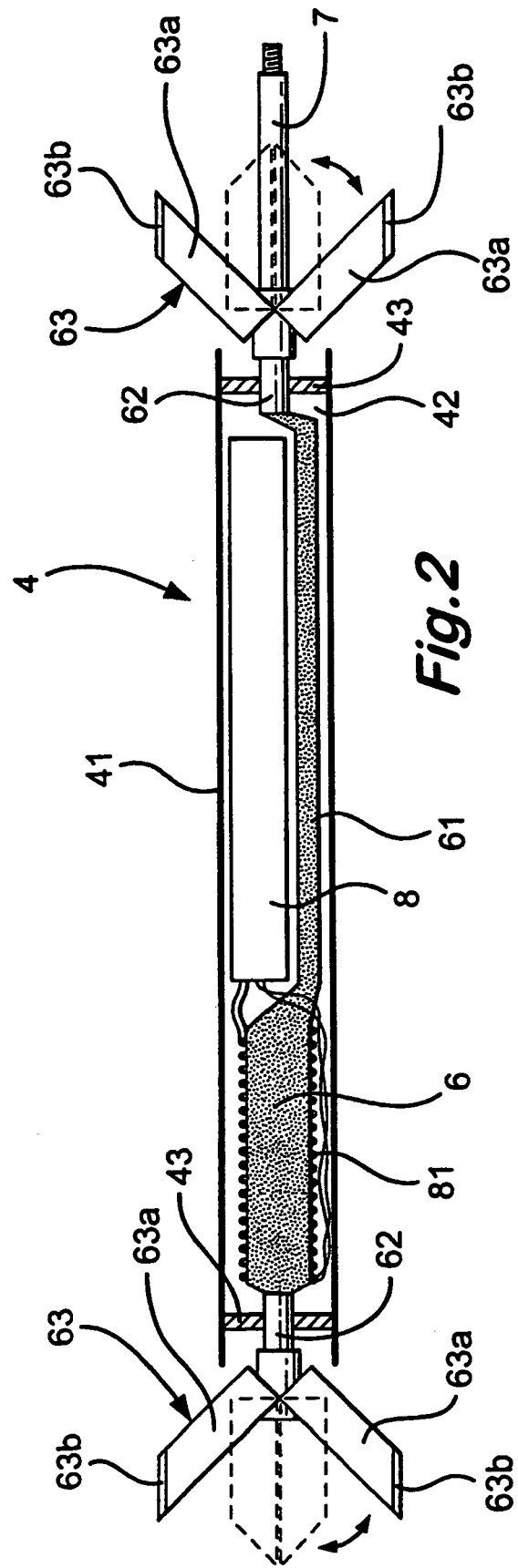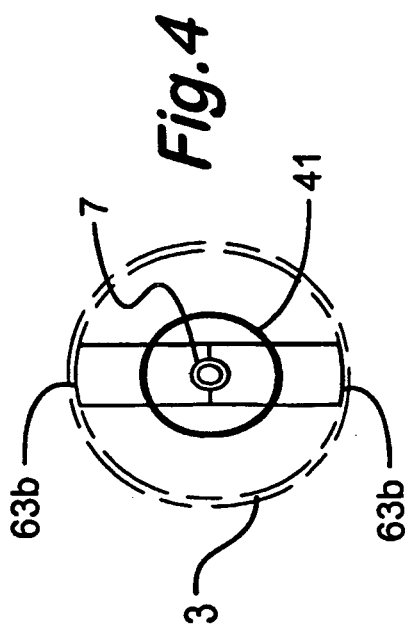

MAGNETIC SIGNALLING IN PIPELINES

This application relates to methods, systems and apparatus for signalling in pipelines, in particular from within generally tubular metallic structure of pipeline systems.

In a number of circumstances it is desirable to be able to communicate from locations on pipeline systems. Furthermore, in some cases there is a desire to communicate from a location within a piece of tubular metallic structure, for example from within the casing of a well, or from within a flowline such as a production string.

Transmitting from such locations is problematic and conventionally the only feasible way to achieve this is by making use of separate wires which run from the transmitter location.

The applicants have realised that it is possible to signal from within generally tubular metallic structure, such as well casings, using magnetic signals which are propagated away from the transmitting location either along the tubular metallic structure itself or through surrounding media. Similarly it is possible to signal to such locations in a similar way.

The present invention relates to methods, systems and apparatus which make use of these principles.

According to a first aspect of the present invention there is provided a transmission unit for use in signalling from within generally tubular metallic structure of a pipeline system, which unit comprises a magnetic material core providing a path for magnetic flux through the unit between two opposing end portions of the core which are arranged for location adjacent an inner surface of a tubular structure, and transmitting means for causing magnetic flux to flow through the core.

When such a transmission unit is disposed in a tubular metallic structure with the end portions adjacent the inner surface of the structure, operating the transmitting means causes magnetic flux to flow through the core and an adjacent portion of the tubular structure and hence, because of flux leakage, causes magnetic signals to be propagated away from the transmission unit. These signals may be received by detecting means disposed at a remote location.

According to a second aspect of the invention there is provided a data transmission method for signalling from within generally tubular metallic structure of a pipeline system, comprising the steps of:
  providing a transmission unit within the tubular structure, which unit comprises a magnetic material core providing a path for magnetic flux through the unit between two opposing end portions of the core which are arranged for location adjacent an inner surface of the tubular structure, and transmitting means for causing magnetic flux to flow through the core;
  operating the transmitting means to cause magnetic flux to flow through the core and an adjacent portion of the tubular structure; and
  detecting, at a location remote from the transmission unit, magnetic signals propagated away from the transmission unit.

According to a third aspect of the invention there is provided a data transmission system for signalling from within generally tubular metallic structure of a pipeline system, comprising:
  a transmission unit disposed within the tubular structure, which unit comprises a magnetic material core providing a path for magnetic flux through the unit between two opposing end portions of the core which are located adjacent an inner surface of the tubular structure, and transmitting means for causing magnetic flux to flow through the core, wherein operating the transmitting means causes magnetic flux to flow through a portion of the tubular structure adjacent the core as well as the core itself.

The data transmission system may comprise detecting means, at a location remote from the transmission unit, for detecting magnetic signals propagated away from the transmission unit.

The transmission unit may comprise a casing which houses all or part of the magnetic material core as well as the transmitting means. However, it should be appreciated that even if the core runs externally to any casing or no casing is present, the core can still provide a path for magnetic flux "through" the unit.

Preferably the end portions of the core have contact surfaces for contacting with the inner surface of the tubular structure when in use. The contact surfaces may be profiled to closely match a shape of the inner surface of the tubular structure. Often the tubular structure will be generally cylindrical and have a circular cross-section. However, many other shapes are possible and contact surfaces may be profiled to meet these.

Each end portion may comprise a plurality of arms, each arm being arranged to contact with the inner surface of the tubular structure at a respective position.

The respective positions may be spaced from one another. The arms of one end portion may be arranged to contact with the tubular structure at circumferentially spaced locations. Similarly the arms of the other end portion may be arranged to contact with the tubular structure at circumferentially spaced locations.

The arms in each end portion may be movable between a retracted position and an operative position. The arms may be placed in the retracted position whilst the transmission unit is deployed and moved to the operative position for use. The arms may be pivotally mounted on the transmission unit. The arms may be arranged to be "bent out" or splayed into contact with the surrounding structure.

The transmitting means may comprise a coil wound around the magnetic material core.

The transmission unit may comprise a pressure vessel. Part of the magnetic material core may be disposed within the pressure vessel and part may be disposed outside of the pressure vessel. The magnetic material core may comprise non-laminated sections in the regions where the core passes from the inside to the outside of the pressure vessel. The magnetic material core may comprise composite bonded laminated material at least in the regions where the core passes from the inside to the outside of the pressure vessel.

The detecting means for receiving magnetic signals propagated away from the transmission unit may comprise a loop coil. The loop coil may be provided around a remote portion of the tubular metallic structure or another connected portion of metallic structure. In an alternative, the loop coil may be located so as to receive signals propagated through the medium surrounding the tubular metallic structure. The position and orientation of the loop coil may be chosen for convenience and/or to maximise received signal.

The above unit, system and method may be arranged for use in wells. The system may be a downhole to surface data transmission system. The method may be a downhole to surface data transmission method. The transmission unit may be for use in signalling from a downhole location in a well. The pipeline system may comprise a well. The generally tubular metallic structure from within which signals are sent may be a well casing or a flowline, in particular a production or drill string.

According to a another aspect of the present invention there is provided a receiving unit for use in receiving signals within generally tubular metallic structure of a pipeline system, which unit comprises a magnetic material core providing a path for magnetic flux through the unit between two opposing end portions of the core which are arranged for location adjacent an inner surface of a tubular structure, and receiving means for detecting magnetic flux flowing through the core.

According to a further aspect of the invention there is provided a data reception method for receiving signals within generally tubular metallic structure of a pipeline system, comprising the steps of:

provided a receiving unit within the tubular structure, which unit comprises a magnetic material core providing a path for magnetic flux through the unit between two opposing end portions of the core which are arranged for location adjacent an inner surface of the tubular structure, and receiving means for detecting magnetic flux flowing through the core;

operating a transmitting means at a location remote from the receiving unit to cause magnetic signals to propagate towards the receiving unit; and using the receiving unit to detect the transmitted magnetic signals by virtue of the magnetic flux which is caused to flow within the core.

According to yet another aspect of the invention there is provided a data reception system for receiving signals within generally tubular metallic structure of a pipeline system, comprising:

a receiving unit disposed within the tubular structure, which unit comprises a magnetic material core providing a path for magnetic flux through the unit between two opposing end portions of the core which are located adjacent an inner surface of the tubular structure, and receiving means for detecting magnetic flux flowing through the core, wherein in operation magnetic flux flows through a portion of the tubular structure adjacent the core as well as the core itself.

Many of the sub-features introduced following the first to third aspects of the invention are equally applicable to the three aspects defined above, changes in wording being made where necessary, for example "transmission unit" to "receiving unit".

The transmitting unit may also comprise receiving means and thus act as a transceiving unit. Such a unit may be used as a relay station.

The present invention will now be described, by way of example only, with reference to the accompanying drawings in which:

FIG. 1 schematically shows a downhole magnetic data transmission system situated in a well;

FIG. 2 shows the transmission unit of the data transmission system in more detail;

FIG. 4 is a schematic cross-sectional view showing the transmission unit located within the casing.

Figure 1:
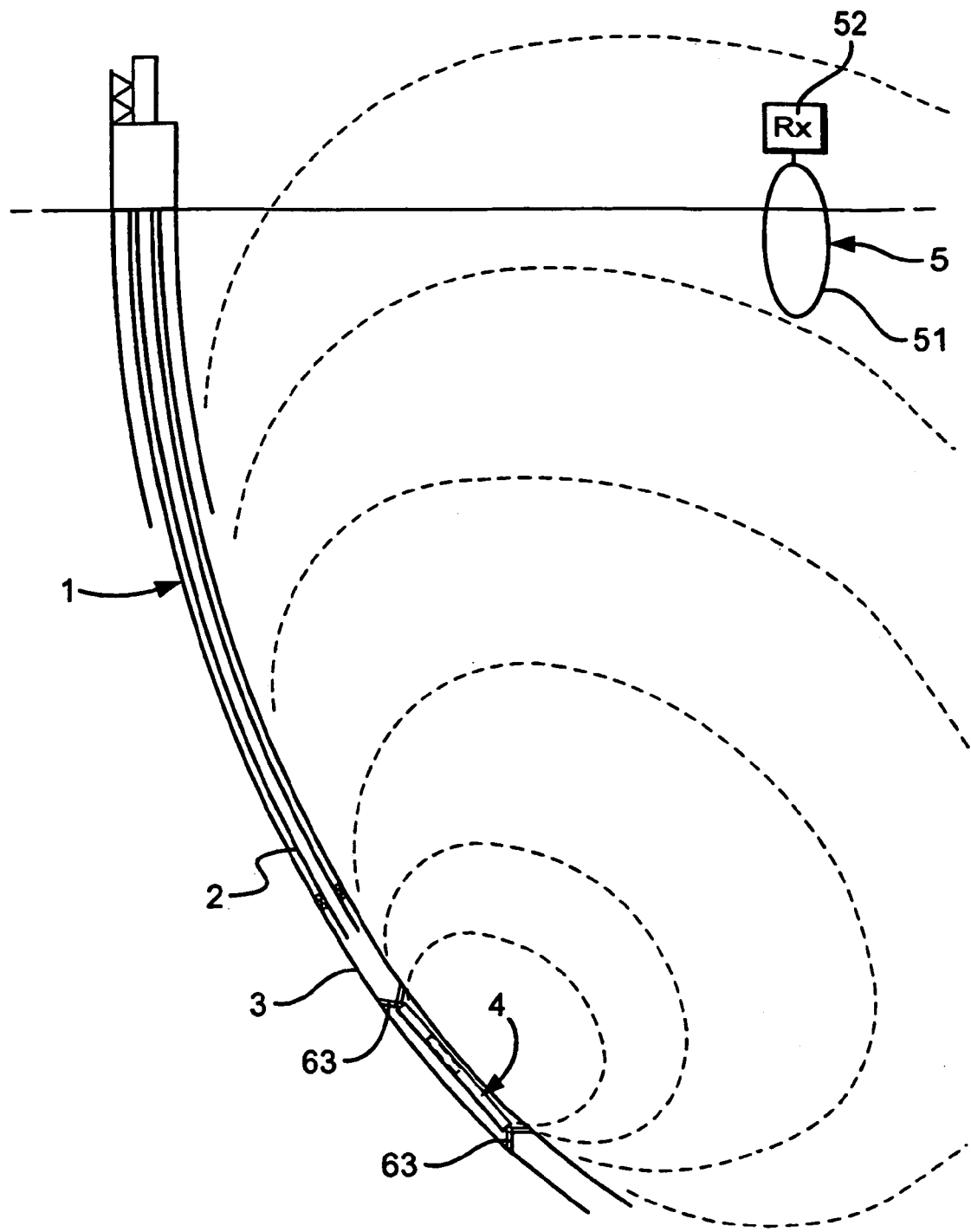

FIG. 1 schematically shows a downhole data transmission system located in a well 1. The well 1 comprises a production string 2 and surrounding casing 3.

The data transmission system comprises a data transmission unit 4 disposed within the casing and detecting means 5 including a loop coil 51 and receiver 52 disposed in a position remote from the data transmission unit 4.

FIG. 2 shows the data transmission unit 4 in more detail. The data transmission unit 4 comprises a casing 41 which provides a pressure vessel 42 for protecting the contents from the ambient pressure and having pressure bulkheads 43 at each end.

The transmission unit 4 further comprises a magnetic material core 6 which provides a path for magnetic flux through the transmission unit 4. A central part of the magnetic material core 61 is provided within the pressure vessel 42. This central portion of the core 61 comprises laminated magnetic material. At either end of this central portion of the magnetic core 61, non-laminated sections of the core 62 are provided and these pass through the respective pressure bulkheads 43 to the exterior of the pressure vessel 42. Beyond each non-laminated section of the core 62 there is provided a respective end portion of the core 63.

In the present embodiment, the end portions of the core 63 each comprise a respective pair of deployable arms 63a which are pivotally mounted to the transmission unit 4 and may be moved between a retracted position as shown in dotted lines in FIG. 2 and an extended, operative, position as shown in solid lines in FIG. 2.

Figure 3:
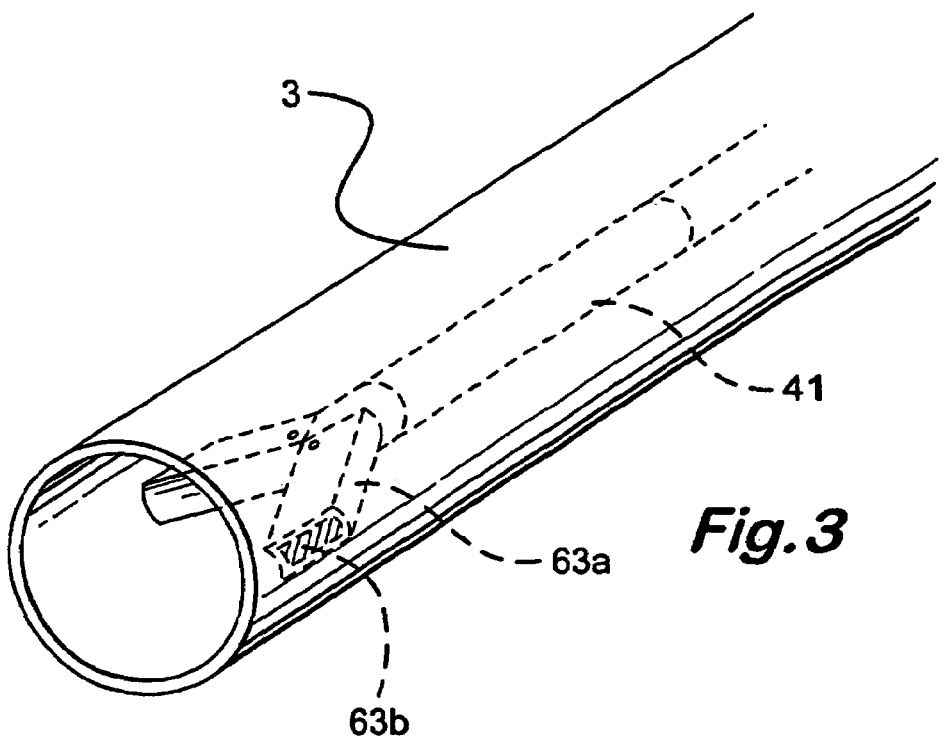
FIG. 3 shows part of the transmission unit as situated within the casing of the well.

Each of the arms 63a, is formed of laminated magnetic material and has a respective contact surface 63b which is arranged for contact with the internal curved surface of the surrounding tubular structure, in this embodiment, the surrounding well casing 3. As more clearly seen in FIGS. 3 and 4 the contact surfaces 63b are profiled so as to closely match the curvature of the inner surface of the surrounding well casing 3. This serves to ensure that close and efficient contact is achieved between the arms 63a and the surrounding well casing 3.

It will be noted that when the arms 63a are in their retracted positions their overall diameter is slightly smaller than that of the casing itself. On the other hand, when the arms 63a are in their extended positions, the contact surfaces 63b on the arms 63a in each pair are spaced by a distance which is significantly greater than the diameter of the transmission unit casing 41. This significantly aids in the installation of the transmission unit 4, and facilitates it being passed along a tubing of internal diameter significantly smaller than the tubing where the transmission unit is to be eventually located. The arms 63a may also be later retracted into the position shown in dotted lines in FIG. 2, and of course this can be of assistance in removal and recovery of the transmission unit from its installed location.

An attachment point 7 is provided at one end of the transmission unit 4. This attachment point is used for connection to a wire line or other deployment system used when installing or recovering the transmission unit.

An electronics, battery and sensor module 8 is provided within the pressure vessel 42. A coil 81 is wound around part of the central portion of the magnetic material core 61. Together with components within the electronics battery and sensor module 8, the coil 81 forms a transmitting means for causing magnetic flux to flow within the magnetic material core 6 to allow signalling away from the transmission unit 4.

The electronics, battery and sensor module 8, and the central portion 61 of the magnetic core are arranged to give a compact structure such that the diameter of the casing 41 can be kept to a minimum and the maximum usage of available space is made.

To achieve this it will be noted that the magnetic core 6 has a greater diameter in the region of the coil 81 than in the region adjacent to the electronics, battery and sensor module 8.

In a development of the structure shown in the drawings, the magnetic core 6 may be constructed as a hollow cylinder and the electronics, battery and sensor module 8 located within that cylinder. In either case, the magnetic core 6 may be of a diameter substantially equal to the internal diameter of the casing 41 and be tapered inwards in the region of the coil 81 to provide accommodation space for the wires of the coil 81.

In operation, the transmitting means comprising electronics in the module 8 and the coil 81, are used to induce magnetic flux in the central portion 61 of the core 6. This flux then flows through the whole of the core, including the end portions 63, and hence comes into contact with the surrounding well casing 3. At this point some of the flux flows through the portion of well casing 3 between the end portions 63 of the core 6 completing a magnetic circuit, but other flux escapes both into the surrounding media (typically rock) and along the well casing 3 away from the transmission unit 4. To maximise the effectiveness of this technique attempts can be made to saturate (in the magnetic sense) the steel of the well casing 3 in the region between the end portions 63 of the core 6.

In the present embodiment, data transmission is achieved by making use of the flux which escapes through the surrounding media. This flux is picked up by the detecting means 5 positioned at the surface. In this way data may be sent from the data transmission unit 4, disposed within the well casing 3, to the surface. The data transmitted may typically consist of measurements taken by sensors provided within the data transmission unit 4.

In an alternative, a loop coil of a type similar to that shown in FIG. 1, may be positioned around the tubular metallic structure at the surface or metallic structure connected to the tubular structure, in this case the well head. In such a case signals may be received by virtue of the flux which travels along the well casing 3 (and possibly other metallic structure) away from the transmission unit 4.

The frequency of magnetic signals to be used will typically be determined empirically based on those that give best results. Where signals are detected having travelled through the surrounding media, the characteristics of the media will dictate what frequencies work best. It is to be expected in most cases however, that low frequency signals, say in the order of a few 10s of Hz will be effective. Often only low data rates are required, of say a few bits/s.

It will be noted that in the present embodiment a pair of arms are used in each end portion of the magnetic material core 6. However, this is not essential. It is envisaged that other numbers of arms could be used, and indeed entirely different end portion structures might be used. What is important is that a pair of opposing end portions are provided which can be located adjacent to the inner surface of the surrounding tubular structure. Of course there is no need for such end portions to be pivotally mounted, this merely serves to ease deployment and recovery of the transmission unit 4. Similarly, different arrangements for the whole of the magnetic core 6 can be envisaged and in some circumstances it may be possible to do away with the pressure vessel 42 and/or the whole of the transmission unit casing 41. As an example the magnetic core 6 and associated coil 81 can be housed separately and/or deployed/recovered separately from the electronics and other components.

Figure 5A:
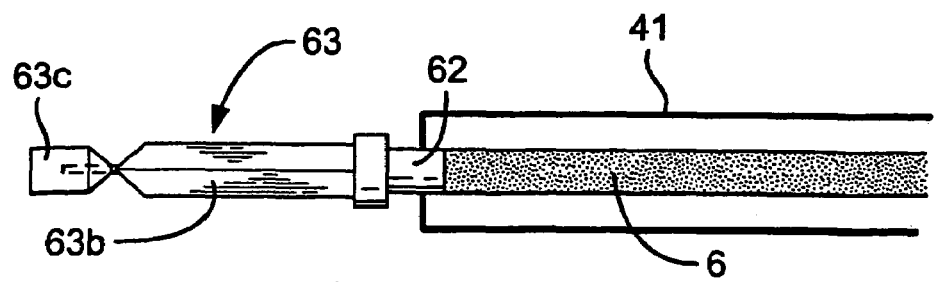
FIGS. 5A and 5B show an alternative configuration for the end portions of a magnetic material core of a transmission unit of the type shown in FIG. 2.
Figure 5B:
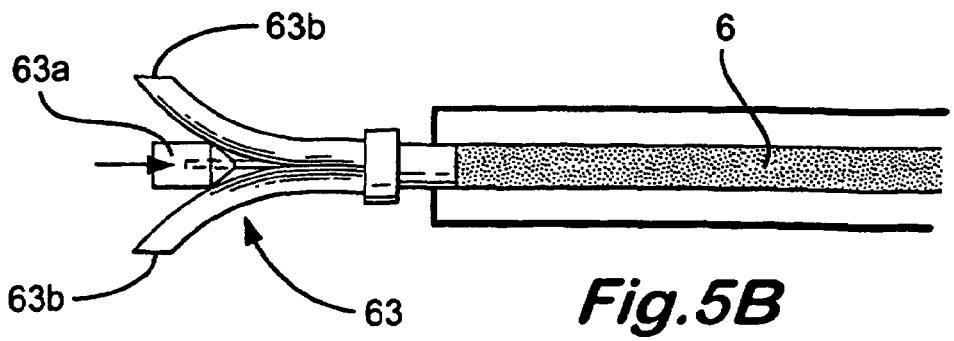

FIGS. 5A and 5B show an alternative form of end portion 63 which may be used in place of the pivoting arm structure shown in FIG. 2. In this case the arms 63b of the end portion 63 are arranged to move between a retracted position, as shown in FIG. 5A, and a splayed (deployed) position, as shown in FIG. 5B, by bending. A deployment cone 63c is provided which is pulled inbetween the arms 63b, in the direction shown by the arrow in FIG. 5B, to drive the arms 63b outward to their deployed position and hence into contact with the surrounding tubular structure.

When inserted and in operation, the transmission unit 4 can be considered to act as a transmitting magnetic dipole.

The arrangement used in the present embodiment where the detecting means is arranged for receiving signals transmitted through the surrounding media is particularly suitable where a well is horizontal or includes a substantial horizontal displacement from the well head. On the other hand the alternative arrangement, where the detecting means is located around the well head, is more suitable where a well is essentially vertical.

To some extent the range at which signals may be received, particularly when using the arrangement of the preferred embodiment, can be improved by increasing the diameter of the loop coil and/or the number of turns.

One advantage of a magnetic system of this kind is that the relevant magnetic properties of the magnetic material core 6 can be chosen to be vastly different from the steel of the pipeline infrastructure. In particular the magnetic material in the core might be selected to have a relative permeability which is much higher than that of the steel—the difference might be a factor of $10^3$ or $10^5$.

Although not described in detail, it should be appreciated that a unit having a structure substantially the same as that shown in the drawings and described above may be used for the reception of signals as well as and/or in alternative to the sending of signals. A receiving unit will have the same general structure as that described above but the coil 81 will have associated electronics which together act as receiving means. A transceiving unit, able to both transmit and receive, will have both transmitting means and receiving means. In such a case many of the components of the system may be used in both transmit and receive mode. In particular only a single core 6 is likely to be provided and a single or separate coils 81 may be provided as a matter of design choice.

In receive mode, signals will be picked up by virtue of flux flowing along the metallic structure (which may be applied by a similar, but remote, transmission unit). In such a case a large portion of the flux reaching the receiving unit will travel along the magnetic core 6, because the core 6 offers a much better path for the flux than the surrounding steel. The flux flowing in the core will induce a current in the coil 81 which can be detected.

A transceiver unit might be used as a relay station.

A pair of transceiver units might be used either side of a break in the metallic structure of a well (caused for example by a certain type of join or branch). Such an arrangement may provide a link such that a continuous communication path from the isolated section of the structure, to the surface is achieved. Apart from the link another type of signalling, for example electrical signalling along the structure, might be used.

It will be noted that transmitting and receiving units of the present system are locatable wholly within conductive tubing. Further no modification to the tubing in the region of the unit is required. This means that the units can be used in tubing of existing installations (even when the tubing is continuous) and indeed means that there is little limitation on the location from or to which data is sent. Further, because of the signalling technique used, at least in some cases, it is possible to signal from within say a (metallic) drill string even if the string is surrounded by metallic casing at the point from which signals are to be sent.

The invention claimed is:

1. A transmission unit for use in signalling from within generally tubular metallic structure of a pipeline system, which unit comprises a magnetic material core providing a path for magnetic flux through the unit between two opposing end portions of the core which are arranged for location adjacent an inner surface of a tubular structure, and a transmitter for causing magnetic flux to flow through the core, wherein the end portions of the core have contact surfaces for contacting with the inner surface of the tubular structure when in use and the contact surfaces are profiled to closely match a shape of the inner surface of the tubular structure.

2. A transmission unit according to claim 1 which is arranged for location wholly within a tubular structure from within which signals are to be sent.

3. A transmission unit according to claim 2 which is arranged to be operable from within an existing continuous tubular structure and without modification to the existing continuous tubular structure.

4. A transmission unit according to claim 1 comprising a casing which houses at least part of the magnetic material core as well as the transmitter.

5. A transmission unit according to claim 1 in which each end portion comprises a plurality of arms, each arm being arranged to contact with the inner surface of the tubular structure at a respective position.

6. A transmission unit according to claim 5 in which the arms of one end portion may be arranged to contact with the tubular structure at circumferentially spaced locations.

7. A transmission unit according to claim 5 in which the arms in each end portion are movable between a retracted position and an operative position.

8. A transmission unit according to claim 1 in which the transmitter comprises a coil wound around the magnetic material core.

9. A transmission unit according to claim 1 which comprises a pressure vessel where part of the magnetic material core is disposed within the pressure vessel and part is disposed outside of the pressure vessel and the magnetic material core comprises non-laminated sections in the region where the core passes from the inside to the outside of the pressure vessel.

10. A transmission unit according to claim 1 which further comprises a receiver and thus may act as a transceiving unit.

11. A data transmission method for signalling from within generally tubular metallic structure of a pipeline system, comprising the steps of:
providing a transmission unit according to claim 1 within the tubular structure so that the end portions of the core are adjacent an inner surface of the tubular structure with the contact surfaces in contact with said inner surface;
operating the transmitting means to cause magnetic flux to flow through the core and an adjacent portion of the tubular structure; and
detecting, at a location remote from the transmission unit, magnetic signals propagated away from the transmission unit.

12. A data transmission system for signalling from within generally tubular metallic structure of a pipeline system, comprising:

a transmission unit according to claim 1 disposed within the tubular structure so that the end portions of the core are located adjacent an inner surface of the tubular structure with the contact surfaces in contact with said inner surface, wherein operating the transmitter causes magnetic flux to flow through a portion of the tubular structure adjacent the core as well as the core itself.

13. A data transmission system according to claim 12 comprising a detector, at a location remote from the transmission unit, for detecting magnetic signals propagated away from the transmission unit.

14. A data transmission system according to claim 13 wherein the detector for receiving magnetic signals propagated away from the transmission unit comprises a loop coil.

15. A receiving unit for use in receiving signals within generally tubular metallic structure of a pipeline system, which unit comprises a magnetic material core providing a path for magnetic flux through the unit between two opposing end portions of the core which are arranged for location adjacent an inner surface of a tubular structure, and a receiver for detecting magnetic flux flowing through the core, wherein the end portions of the core have contact surfaces for contacting with the inner surface of the tubular structure when in use and the contact surfaces are profiled to closely match a shape of the inner surface of the tubular structure.

16. A receiving unit according to claim 15 which is arranged for location wholly within a tubular structure within which signals are to be received.

17. A receiving unit according to claim 16 which is arranged to be operable from within an existing continuous tubular structure and without modification to the existing continuous tubular structure.

18. A receiving unit according to claim 15 comprising a casing which houses at least part of the magnetic material core as well as the receiver.

19. A receiving unit according to claim 15 in which each end portion comprises a plurality of arms, each arm being arranged to contact with the inner surface of the tubular structure at a respective position.

20. A receiving unit according to claim 19 in which the arms of one end portion may be arranged to contact with the tubular structure at circumferentially spaced locations.

21. A receiving unit according to claim 19 in which the arms in each end portion are movable between a retracted position and an operative position.

22. A receiving unit according to claim 15 in which the receiver comprises a coil wound around the magnetic material core.

23. A receiving unit according to claim 15 which comprises a pressure vessel where part of the magnetic material core is disposed within the pressure vessel and part is disposed outside of the pressure vessel and the magnetic material core comprises non-laminated sections in the region where the core passes from the inside to the outside of the pressure vessel.

24. A data reception method for receiving signals within generally tubular metallic structure of a pipeline system, comprising the steps of:
providing a receiving unit according to claim 15 within the tubular structure, so that the end portions of the core are adjacent an inner surface of the tubular structure with the contact surfaces in contact with said inner surface;
operating a transmitter at a location remote from the receiving unit to cause magnetic signals to propagate towards the receiving unit; and using the receiving unit to detect the transmitted magnetic signals by virtue of the magnetic flux which is caused to flow within the core.

25. A data reception system for receiving signals within generally tubular metallic structure of a pipeline system, comprising:
a receiving unit according to claim 15 disposed within the tubular structure so that end portions of the core are located adjacent an inner surface of the tubular structure with the contact surfaces in contact with said inner surface, wherein in operation magnetic flux flows through a portion of the tubular structure adjacent the core as well as the core itself.

26. A transmission unit for use in signalling from within generally tubular metallic structure of a pipeline system, which unit comprises a magnetic material core providing a path for magnetic flux through the unit between two opposing end portions of the core which are arranged for location adjacent an inner surface of the generally tubular structure from which signals are to be sent, and a transmitter for causing magnetic flux to flow through the core, wherein the transmission unit is arranged for location wholly within the generally tubular structure from which signals are to be sent and the end portions of the core have contact surfaces for contacting with the inner surface of the tubular structure when in use and the contact surfaces are profiled to closely match a shape of the inner surface of the tubular structure.

27. A transmission unit for use in signalling from within generally tubular metallic structure of a pipeline system, which unit comprises a magnetic material core providing a path for magnetic flux through the unit between two opposing end portions of the core which are arranged for location adjacent an inner surface of a tubular structure, and transmitting means for causing magnetic flux to flow through the core, wherein the end portions of the core have contact surfaces for contacting with the inner surface of the tubular structure when in use and the contact surfaces are profiled to closely match a shape of the inner surface of the tubular structure.

28. A receiving unit for use in receiving signals within generally tubular metallic structure of a pipeline system, which unit comprises a magnetic material core providing a path for magnetic flux through the unit between two opposing end portions of the core which are arranged for location adjacent an inner surface of a tubular structure, and receiving means for detecting magnetic flux flowing through the core, wherein the end portions of the core have contact surfaces for contacting with the inner surface of the tubular structure when in use and the contact surfaces are profiled to closely match a shape of the inner surface of the tubular structure.

29. A transmission unit for use in signalling from within generally tubular metallic structure of a pipeline system, which unit comprises a magnetic material core providing a path for magnetic flux through the unit between two opposing end portions of the core which are arranged for location adjacent an inner surface of a tubular structure, and a transmitter for causing magnetic flux to flow through the core, wherein the end portions of the core have contact surfaces for contacting with the inner surface of the tubular structure when in use and each end portion comprises a plurality of arms, each arm being arranged to contact with the inner surface of the tubular structure at a respective position and the arms in each end portion being movable between a retracted position and an operative position.

30. A transmission unit for use in signalling from within generally tubular metallic structure of a pipeline system, which unit comprises a magnetic material core providing a path for magnetic flux through the unit between two opposing end portions of the core which are arranged for location adjacent an inner surface of a tubular structure, a transmitter for causing magnetic flux to flow through the core, wherein the end portions of the core have contact surfaces for contacting with the inner surface of the tubular structure when in use and a pressure vessel where part of the magnetic material core is disposed within the pressure vessel and part is disposed outside of the pressure vessel and the magnetic material core comprises non-laminated sections in the region where the core passes from the inside to the outside of the pressure vessel.

31. A receiving unit for use in receiving signals within generally tubular metallic structure of a pipeline system, which unit comprises a magnetic material core providing a path for magnetic flux through the unit between two opposing end portions of the core which are arranged for location adjacent an inner surface of a tubular structure, and a receiver for detecting magnetic flux flowing through the core, wherein the end portions of the core have contact surfaces for contacting with the inner surface of the tubular structure when in use and each end portion comprises a plurality of arms, each arm being arranged to contact with the inner surface of the tubular structure at a respective position and the arms in each end portion being movable between a retracted position and an operative position.

32. A receiving unit for use in receiving signals within generally tubular metallic structure of a pipeline system, which unit comprises a magnetic material core providing a path for magnetic flux through the unit between two opposing end portions of the core which are arranged for location adjacent an inner surface of a tubular structure, a receiver for detecting magnetic flux flowing through the core, wherein the end portions of the core have contact surfaces for contacting with the inner surface of the tubular structure when in use and a pressure vessel where part of the magnetic material core is disposed within the pressure vessel and part is disposed outside of the pressure vessel and the magnetic material core comprises non-laminated sections in the region where the core passes from the inside to the outside of the pressure vessel.

* * * * *